US008279784B2

(12) United States Patent (10) Patent No.: US 8,279,784 B2
Chiang et al. (45) Date of Patent: Oct. 2, 2012

(54) WIRELESS HD AV PACKET FORMAT

(75) Inventors: Ching-Hsiu Chiang, Fremont, CA (US);
Jeffrey M. Gilbert, Palo Alto, CA (US);
Victor Ramamoorthy, Pleasanton, CA
(US)

(73) Assignee: Sibeam, Inc., Sunnyvale, CA (US)

( * ) Notice: Subject to any disclaimer, the term of this patent is extended or adjusted under 35 U.S.C. 154(b) by 1280 days.

(21) Appl. No.: 11/982,209

(22) Filed: Oct. 31, 2007

(65) Prior Publication Data

US 2008/0130741 A1 Jun. 5, 2008

Related U.S. Application Data

(60) Provisional application No. 60/856,104, filed on Nov. 1, 2006, provisional application No. 60/873,759, filed on Dec. 8, 2006, provisional application No. 60/901,388, filed on Feb. 14, 2007, provisional application No. 60/901,384, filed on Feb. 14, 2007, provisional application No. 60/920,338, filed on Mar. 26, 2007, provisional application No. 60/920,266, filed on Mar. 26, 2007, provisional application No. 60/920,357, filed on Mar. 26, 2007.

(51) Int. Cl.
*H04N 21/2368* (2006.01)
(52) U.S. Cl. ............... 370/289; 370/465; 375/240.02
(58) Field of Classification Search .......... None
See application file for complete search history.

(56) References Cited

U.S. PATENT DOCUMENTS

| | | | |
|---|---|---|---|
| 2007/0189397 A1* | 8/2007 | Ngo et al. | 375/240.26 |
| 2007/0202842 A1* | 8/2007 | Shao et al. | 455/403 |
| 2007/0202843 A1* | 8/2007 | Niu et al. | 455/403 |
| 2007/0223527 A1* | 9/2007 | Shao et al. | 370/468 |
| 2007/0230461 A1* | 10/2007 | Singh et al. | 370/389 |
| 2007/0286103 A1* | 12/2007 | Niu et al. | 370/310 |
| 2008/0037465 A1* | 2/2008 | Ngo et al. | 370/329 |
| 2008/0049707 A1* | 2/2008 | Kwon et al. | 370/343 |
| 2008/0098274 A1* | 4/2008 | Kwon et al. | 714/748 |

FOREIGN PATENT DOCUMENTS

| | | |
|---|---|---|
| EP | 1 385 292 A | 1/2004 |
| EP | 1 494 425 A | 1/2005 |

OTHER PUBLICATIONS

PCT International Search Report dated Sep. 9, 2008, for PCT/US07/023126, filed Nov. 1, 2007, 5 pages.
Written Opinion of the international Searching Authority dated Sep. 9, 2008, for PCT/US07/023126, filed Nov. 1, 2007, 8 pages.

* cited by examiner

*Primary Examiner* — Hassan Phillips
*Assistant Examiner* — Duc Duong
(74) *Attorney, Agent, or Firm* — Blakely, Sokoloff, Taylor & Zafman LLP

(57) ABSTRACT

An audio/video (AV) processor is coupled to a media access controller (MAC) to generate a composite packet having an optimized format for carrying audio, video, and data traffic with fields in a header of the composite packet specifying video-specific information. A physical device interface (PHY) is coupled to the MAC. The PHY encodes and decodes between a digital signal and a modulated analog signal. The PHY comprises a high rate physical layer circuit (HRP) and a low rate physical layer circuit (LRP). A radio frequency (RF) transmitter is coupled to the PHY to transmit data.

20 Claims, 14 Drawing Sheets

| Fragment (Byte) | Phase | Pixels | 8 bit pixel data code (to PHY encoder) | | | | | | | |
|---|---|---|---|---|---|---|---|---|---|---|
| | | | LSB | | | | | | | MSB |
| | | | Bit 0 | Bit 1 | Bit 2 | Bit 3 | Bit 4 | Bit 5 | Bit 6 | Bit 7 |
| 10P0 | 0 | A | A0 | A1 | A2 | A3 | A5 | A6 | A7 | A8 |
| 10P1 | 1 | A & B | A4 | B0 | B1 | B2 | A9 | B5 | B6 | B7 |
| 10P2 | 2 | B & C | B3 | B4 | C0 | C1 | B8 | B9 | C5 | C6 |
| 10P3 | 3 | C & D | C2 | C3 | C4 | D0 | C7 | C8 | C9 | D5 |
| 10P4 | 4 | D | D1 | D2 | D3 | D4 | D6 | D7 | D8 | D9 |

FIG. 5

| Fragment (Byte) | Phase | Pixels | 8 bit pixel data code (to PHY encoder) | | | | | | | |
|---|---|---|---|---|---|---|---|---|---|---|
| | | | LSB | | | | MSB | | | |
| | | | Bit 0 | Bit 1 | Bit 2 | Bit 3 | Bit 4 | Bit 5 | Bit 6 | Bit 7 |
| 12P0 | 0 | A | A0 | A1 | A2 | A3 | A6 | A7 | A8 | A9 |
| 12P1 | 1 | A & B | A4 | A5 | B0 | B1 | A10 | A11 | B6 | B7 |
| 12P2 | 2 | B | B2 | B3 | B4 | B5 | B8 | B9 | B10 | B11 |

FIG. 6

| Fragment (Byte) | Phase | Pixels | 8 bit pixel data code (to PHY encoder) | | | | | | | |
|---|---|---|---|---|---|---|---|---|---|---|
| | | | LSB | | | | | | | MSB |
| | | | Bit 0 | Bit 1 | Bit 2 | Bit 3 | Bit 4 | Bit 5 | Bit 6 | Bit 7 |
| 10P0 | 0 | A | A0 | A1 | A2 | A3 | A4 | A5 | A6 | A7 |
| 10P1 | 1 | A & B | A8 | A9 | B0 | B1 | B2 | B3 | B4 | B5 |
| 10P2 | 2 | B & C | B6 | B7 | B8 | B9 | C0 | C1 | C2 | C3 |
| 10P3 | 3 | C & D | C4 | C5 | C6 | C7 | C8 | C9 | D0 | D1 |
| 10P4 | 4 | D | D2 | D3 | D4 | D5 | D6 | D7 | D8 | D9 |

FIG. 7

| Fragment (Byte) | Phase | Pixels | 8 bit pixel data code (to PHY encoder) | | | | | | | |
| --- | --- | --- | --- | --- | --- | --- | --- | --- | --- | --- |
| | | | LSB | | | | | | | MSB |
| | | | Bit 0 | Bit 1 | Bit 2 | Bit 3 | Bit 4 | Bit 5 | Bit 6 | Bit 7 |
| 12P0 | 0 | A | A0 | A1 | A2 | A3 | A4 | A5 | A6 | A7 |
| 12P1 | 1 | A & B | A8 | A9 | A10 | A11 | B0 | B1 | B2 | B3 |
| 12P2 | 2 | B | B4 | B5 | B6 | B7 | B8 | B9 | B10 | B11 |

FIG. 8

| Byte Order | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 16 bits/pixel | $Y_0$ | $Cb_0$ | $Y_1$ | $Cr_0$ | $Y_2$ | $Cr_2$ | $Y_3$ | $Cb_2$ | $Y_4$ | $Cb_4$ | $Y_5$ | $Cr_5$ | $Y_6$ | $Cr_6$ | $Y_7$ |
| 20 bits/pixel | $Y_0$ | $Cb_0$ | $Y_0/Y_1$ | $Cr_0$ | $Y_1/Y_2$ | $Cr_0/Cr_2$ | $Y_2/Y_3$ | $Cb_0/Cb_2$ | $Y_3$ | $Cb_2/Cb_4$ | $Y_4$ | $Cr_2/Cr_4$ | $Y_4/Y_5$ | $Cr_4/Cr_6$ | $Y_5/Y_6$ |
| 24 bits/pixel | $Y_0$ | $Cb_0$ | $Y_0/Y_1$ | $Cr_0$ | $Y_1$ | $Cr_0/Cr_2$ | $Y_2$ | $Cb_0/Cb_2$ | $Y_2/Y_3$ | $Cb_2$ | $Y_3$ | $Cr_2$ | $Y_4$ | $Cr_4$ | $Y_4/Y_5$ |

FIG.9

| Byte Order | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 16 bits/pixel | $Y_0$ | $Cb_0$ | $Y_1$ | $Cr_0$ | $Y_2$ | $Cr_2$ | $Y_3$ | $Cb_2$ | $Y_4$ | $Cb_4$ | $Y_5$ | $Cr_5$ | $Y_6$ | $Cr_6$ | $Y_7$ |
| 20 bits/pixel | $Y_0$ | $Y_0/Cb_0$ | $Cb_0/Y_1$ | $Y_1/Cr_0$ | $Cr_0$ | $Y_2$ | $Y_2/Cr_2$ | $Cr_2/Y_3$ | $Y_3/Cb_2$ | $Cb_2$ | $Y_4$ | $Y_4/Cb_4$ | $Cb_4/Y_5$ | $Y_5/Cr_6$ | $Cr_6$ |
| 24 bits/pixel | $Y_0$ | $Y_0/Cb_0$ | $Cb_0$ | $Y_1$ | $Y_1/Cr_0$ | $Cr_0$ | $Y_2$ | $Y_2/Cr_2$ | $Cr_2$ | $Y_3$ | $Y_3/Cb_2$ | $Cb_2$ | $Y_4$ | $Y_4/Cr_4$ | $Cr_4$ |

FIG.10

| Byte Order | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 20 bits/pixel, Single Partition | $Y_0$ | $Cb_0$ | $Y_0/Y_1$ | $Cr_0$ | $Y_1/Y_2$ | $Cr_0/Cr_2$ | $Y_2/Y_3$ | $Cb_0/Cb_2$ | $Y_3$ | $Cb_2/Cb_4$ | $Y_4$ | $Cr_2/Cr_4$ | $Y_4/Y_5$ | $Cr_4/Cr_6$ | $Y_5/Y_6$ |

FIG.12

| Byte Order | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 20 bits/pixel, Single Partition | $Y_0$ | $Y_0/Cb_0$ | $Cb_0/Y_1$ | $Y_1/Cr_0$ | $Cr_0$ | $Y_2$ | $Y_2/Cr_2$ | $Cr_2/Y_3$ | $Y_3/Cb_2$ | $Cb_2$ | $Y_4$ | $Y_4/Cb_4$ | $Cb_4/Y_5$ | $Y_5/Cr_6$ | $Cr_6$ |

FIG.13

WIRELESS HD AV PACKET FORMAT

RELATED APPLICATIONS

This application claims the benefit of U.S. Provisional Application No. 60/856,104 filed Nov. 1, 2006, U.S. Provisional Application No. 60/873,759 filed Dec. 8, 2006, U.S. Provisional Application No. 60/901,388 filed Feb. 14, 2007, U.S. Provisional Application No. 60/901,384 filed Feb. 14, 2007, U.S. Provisional Application No. 60/920,338 filed Mar. 26, 2007, U.S. Provisional Application No. 60/920,266 filed Mar. 26, 2007, U.S. Provisional Application No. 60/920,357 filed Mar. 26, 2007.

FIELD OF THE INVENTION

The present invention relates to the field of wireless communication; more particularly, the present invention relates to a wireless communication device.

BACKGROUND OF THE INVENTION

In 1998, the Digital Display Working Group (DDWG) was formed to create a universal interface standard between computers and displays to replace the analog VGA connection standard. The resulting standard was the Digital Visual Interface (DVI) specification, released in April 1999. There are a number of content protection schemes available. For example, HDCP and DTCP are well-known content protection schemes. HDCP was proposed as a security component for DVI and was designed for digital video monitor interfaces.

HDMI is a connection interface standard that was developed to meet the explosive demand for high-definition audio and video. HDMI is capable of carrying video and audio and is backward-compatible with DVI (which carries only video signals). The key advantage of DVI and HDMI is that both of them are capable of transmitting uncompressed high-definition digital streams via a single cable.

HDCP is a system for protecting content being transferred over DVI and HDMI from being copied. See HDCP 1.0 for details. HDCP provides authentication, encryption, and revocation. Specialized circuitry in the playback device and in the display monitor encrypts video data before it is sent over. With HDCP, content is encrypted immediately before (or inside) the DVI or HDMI transmitter chip and decrypted immediately after (or inside) the DVI or HDMI receiver chip.

In addition to the encryption and decryption functions, HDCP implements authentication to verify that the receiving device (e.g., a display, a television, etc.) is licensed to receive encrypted content. Re-authentication occurs approximately every two seconds to continuously confirm the security of the DVI or HDMI interface. If, at any time, re-authentication does not occur, for example by disconnecting a device and/or connecting an illegal recording device, the source device (e.g., a DVD player, a set-top box, etc.) ends transmission of encrypted content.

While discussions of HDMI and DVI are generally focused on wired communication, the use of wireless communication to transmit content has become more prevalent every day. While much of the current focus is on cellular technologies and wireless networks, there has been a growing interest in the unlicensed spectrum around 60 GHz for wireless video transmission or very high-speed networking. More specifically, seven GHz of contiguous bandwidth has been opened for unlicensed use at millimeter-wave frequencies around 60 GHz in the U.S. and Japan.

SUMMARY OF THE INVENTION

A media access controller (MAC) generates a composite packet having an optimized format for carrying audio, video, and data traffic. A physical device interface (PHY) is coupled to the MAC. The PHY to encode and decode between a digital signal and a modulated analog signal. The PHY comprises a high rate physical layer circuit (HRP) and a low rate physical layer circuit (LRP). A radio frequency (RF) transmitter is coupled to the PHY to transmit data.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 5 is a block diagram of a first embodiment of deep color pixel packing.

FIG. 6 is a block diagram of a first embodiment of deep color pixel packing.

FIG. 7 is a block diagram of a second embodiment of deep color pixel packing.

FIG. 8 is a block diagram of a second embodiment of deep color pixel packing.

FIG. 9 is a table of a first embodiment of a video sub-packet.

FIG. 10 is a table of a second embodiment of a video sub-packet.

FIG. 12 is a table illustrating an example of deep color multiple-partitions in accordance with a first embodiment.

FIG. 13 is a table illustrating an example of deep color multiple-partitions in accordance with a second embodiment.

DETAILED DESCRIPTION OF THE PRESENT INVENTION

An apparatus and method for wireless communication is disclosed. In one embodiment, the wireless communication occurs using a wireless transceiver with or without an adaptive beamforming antenna. As would be apparent to one skilled in the art, the wireless communication could occur with a wireless receiver or transmitter.

A media access controller (MAC) generates a composite packet having an optimized format for carrying audio, video, and data traffic. A physical device interface (PHY) is coupled to the MAC. The PHY to encode and decode between a digital signal and a modulated analog signal. The PHY comprises a high rate physical layer circuit (HRP) and a low rate physical layer circuit (LRP). A radio frequency (RF) transmitter is coupled to the PHY to transmit data.

In one embodiment, the wireless communication includes an additional link, or channel, for transmitting information between a transmitter and a receiver. The link may be unidirectional or bi-directional. In one embodiment, the channel is used to send antenna information back from a receiver to a transmitter to enable the transmitter to adapt its antenna array by steering the antenna elements to find a path to another direction. This may be obstacle avoidance.

In one embodiment, the link is also used to transfer information corresponding to the content that is being transferred wirelessly (e.g., wireless video). This information may be content protection information. For example, in one embodiment, the link is used to transfer encryption keys and acknowledgements of encryption keys when the transceivers are transferring HDMI data. Thus, in one embodiment, the link transfers control information and content protection information.

Figure 1:
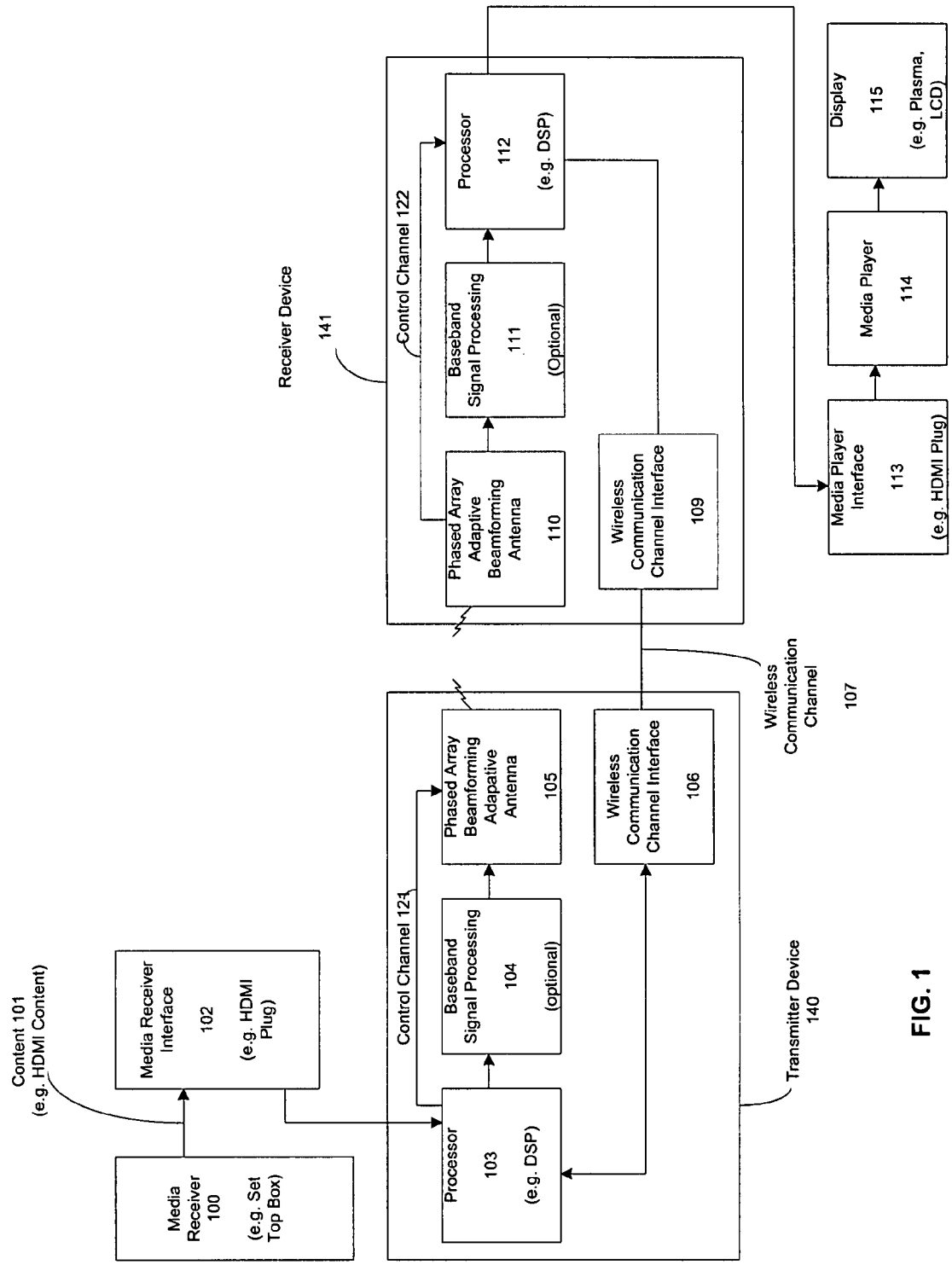
FIG. 1 is a block diagram of one embodiment of a communication system.

FIG. 1 is a block diagram of one embodiment of a communication system. Referring to FIG. 1, the system comprises media receiver 100, a media receiver interface 102, a transmitting device 140, a receiving device 141, a media player interface 113, a media player 114 and a display 115.

Media receiver 100 receives content from a source (not shown). In one embodiment, media receiver 100 comprises a set top box. The content may comprise baseband digital video, such as, for example, but not limited to, content adhering to the HDMI or DVI standards. In such a case, media receiver 100 may include a transmitter (e.g., an HDMI transmitter) to forward the received content.

Media receiver 101 sends content 101 to transmitter device 140 via media receiver interface 102. In one embodiment, media receiver interface 102 includes logic that converts content 101 into HDMI content. In such a case, media receiver interface 102 may comprise an HDMI plug and content 101 is sent via a wired connection; however, the transfer could occur through a wireless connection. In another embodiment, content 101 comprises DVI content.

In one embodiment, the transfer of content 101 between media receiver interface 102 and transmitter device 140 occurs over a wired connection; however, the transfer could occur through a wireless connection.

Transmitter device 140 wirelessly transfers information to receiver device 141 using two wireless connections. One of the wireless connections is through a phased array antenna with adaptive beamforming, also referred as High Rate channel. The other wireless connection is via wireless communications channel 107, referred to herein as the Low Rate channel. In one embodiment, the HR and LR wireless communication are enabled through a MAC, and a PHY (discussed in FIG. 2).

Receiver device 141 transfers the content received from transmitter device 140 to media player 114 via media player interface 113. In one embodiment, the transfer of the content between receiver device 141 and media player interface 113 occurs through a wired connection; however, the transfer could occur through a wireless connection. In one embodiment, media player interface 113 comprises an HDMI plug. Similarly, the transfer of the content between media player interface 113 and media player 114 occurs through a wired connection; however, the transfer could occur through a wireless connection.

Media player 114 causes the content to be played on display 115. In one embodiment, the content is HDMI content and media player 114 transfer the media content to display via a wired connection; however, the transfer could occur through a wireless connection. Display 115 may comprise a plasma display, an LCD, a CRT, etc.

Note that the system in FIG. 1 may be altered to include a DVD player/recorder in place of a DVD player/recorder to receive, and play and/or record the content.

Figure 3:
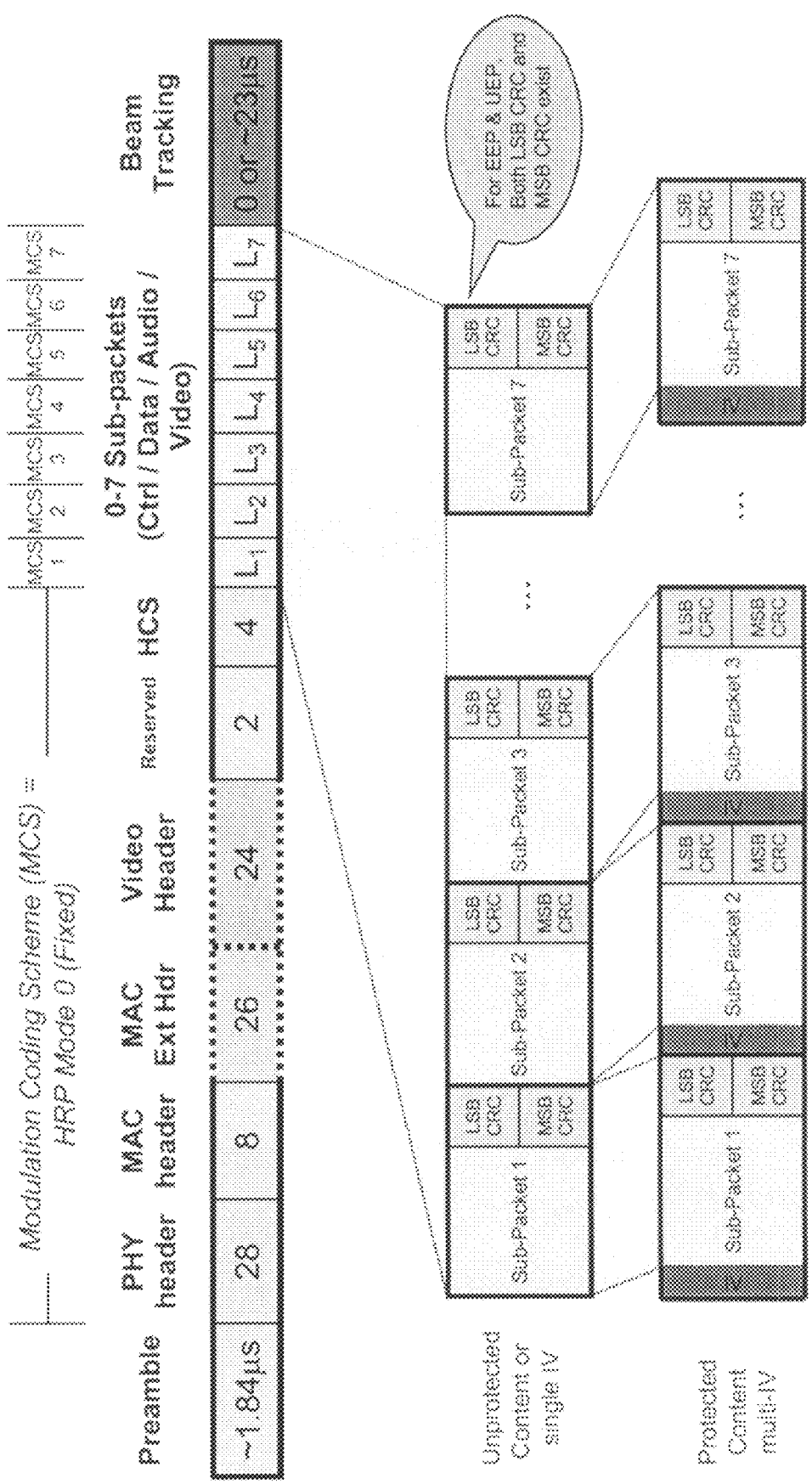
FIG. 3 is a block diagram of one embodiment of a packet format of a PHY mode segmentation.

In one embodiment, transmitter 140 and media receiver interface 102 are part of media receiver 100. Similarly, in one embodiment, receiver 140, media player interface 113, and media player 114 are all part of the same device. In an alternative embodiment, receiver 140, media player interface 113, media player 114, and display 115 are all part of the display. An example of such a device is shown in FIG. 3.

In one embodiment, transmitter device 140 comprises a processor 103, an optional baseband processing component 104, a phased array antenna 105, and a wireless communication channel interface 106. Phased array antenna 105 comprises a radio frequency (RF) transmitter having a digitally controlled phased array antenna coupled to and controlled by processor 103 to transmit content to receiver device 141 using adaptive beamforming.

In one embodiment, receiver device 141 comprises a processor 112, an optional baseband processing component 111, a phased array antenna 110, and a wireless communication channel interface 109. Phased array antenna 110 comprises a radio frequency (RF) transmitter having a digitally controlled phased array antenna coupled to and controlled by processor 112 to receive content from transmitter device 140 using adaptive beamforming.

In one embodiment, processor 103 generates baseband signals that are processed by baseband signal processing 104 prior to being wirelessly transmitted by phased array antenna 105. In such a case, receiver device 141 includes baseband signal processing to convert analog signals received by phased array antenna 110 into baseband signals for processing by processor 112. In one embodiment, the baseband signals are orthogonal frequency division multiplex (OFDM) signals. In one embodiment, the baseband signals are single carrier phase, amplitude, or both phase and amplitude modulated signals.

In one embodiment, transmitter device 140 and/or receiver device 141 are part of separate transceivers.

Transmitter device 140 and receiver device 141 perform wireless communication using phased array antenna with adaptive beamforming that allows beam steering. Beamforming is well known in the art. In one embodiment, processor 103 sends digital control information to phased array antenna 105 to indicate an amount to shift one or more phase shifters in phased array antenna 105 to steer a beam formed thereby in a manner well-known in the art. Processor 112 uses digital control information as well to control phased array antenna 110. The digital control information is sent using control channel 121 in transmitter device 140 and control channel 122 in receiver device 141. In one embodiment, the digital control information comprises a set of coefficients. In one embodiment, each of processors 103 and 112 comprises a digital signal processor.

Wireless communication link interface 106 is coupled to processor 103 and provides an interface between wireless communication link 107 and processor 103 to communicate antenna information relating to the use of the phased array antenna and to communicate information to facilitate playing the content at another location. In one embodiment, the information transferred between transmitter device 140 and receiver device 141 to facilitate playing the content includes encryption keys sent from processor 103 to processor 112 of receiver device 141 and one or more acknowledgments from processor 112 of receiver device 141 to processor 103 of transmitter device 140.

Wireless communication link 107 also transfers antenna information between transmitter device 140 and receiver device 141. During initialization of the phased array antennas 105 and 110, wireless communication link 107 transfers information to enable processor 103 to select a direction for the phased array antenna 105. In one embodiment, the information includes, but is not limited to, antenna location information and performance information corresponding to the antenna location, such as one or more pairs of data that include the position of phased array antenna 110 and the signal strength of the channel for that antenna position. In another embodiment, the information includes, but is not limited to, information sent by processor 112 to processor 103 to enable processor 103 to determine which portions of phased array antenna 105 to use to transfer content.

When the phased array antennas 105 and 110 are operating in a mode during which they may transfer content (e.g., HDMI content), wireless communication link 107 transfers an indication of the status of communication path from the processor 112 of receiver device 141. The indication of the status of communication comprises an indication from processor 112 that prompts processor 103 to steer the beam in another direction (e.g., to another channel). Such prompting may occur in response to interference with transmission of portions of the content. The information may specify one or more alternative channels that processor 103 may use.

In one embodiment, the antenna information comprises information sent by processor 112 to specify a location to which receiver device 141 is to direct phased array antenna 110. This may be useful during initialization when transmitter device 140 is telling receiver device 141 where to position its antenna so that signal quality measurements can be made to identify the best channels. The position specified may be an exact location or may be a relative location such as, for example, the next location in a predetermined location order being followed by transmitter device 140 and receiver device 141.

In one embodiment, wireless communications link 107 transfers information from receiver device 141 to transmitter device 140 specifying antenna characteristics of phased array antenna 110, or vice versa.

Figure 2:
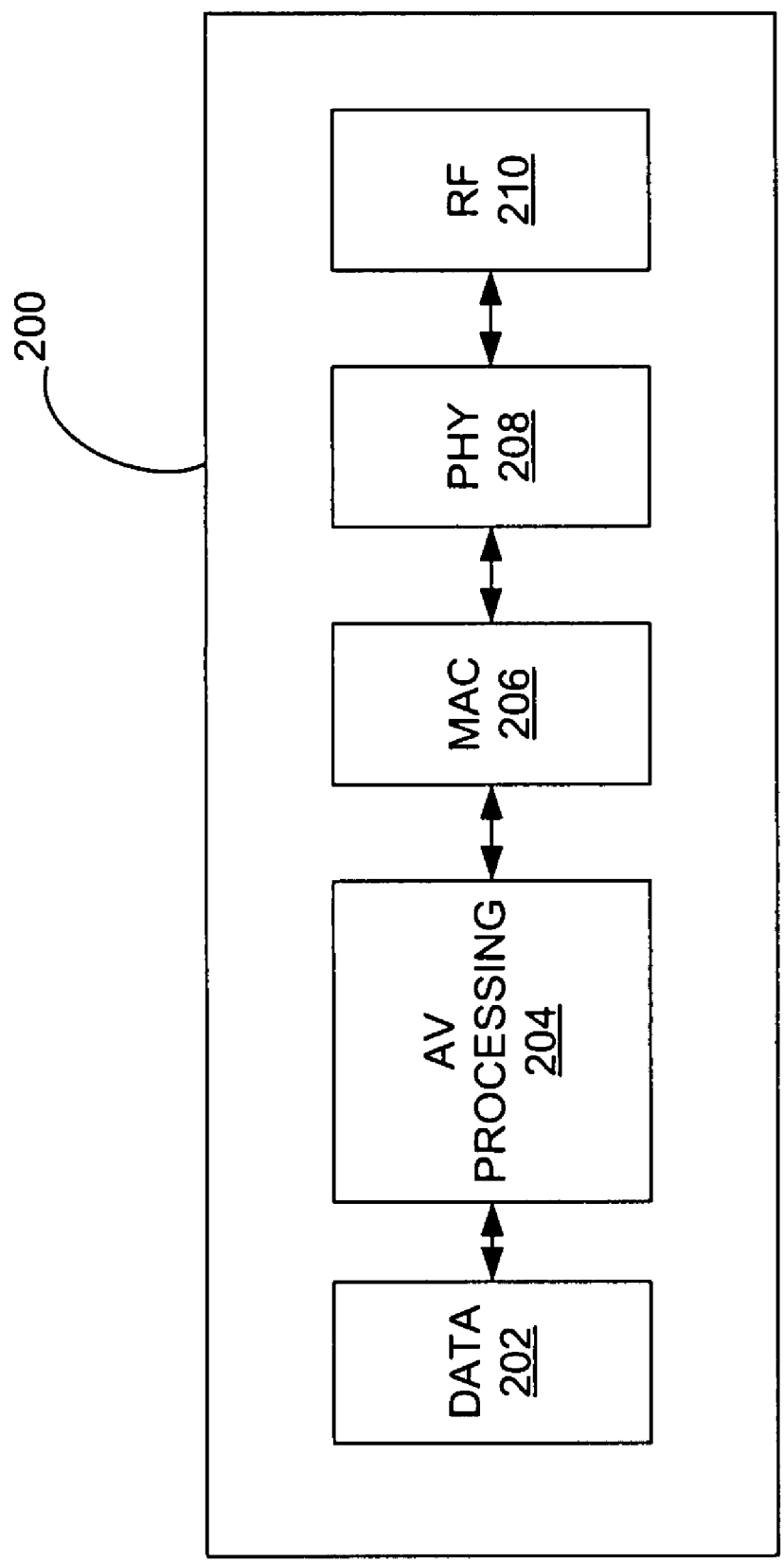
FIG. 2 is a block diagram of one embodiment of a communication device.

FIG. 2 illustrates one embodiment of a communication device 200. The communication device 200 includes data storage 202, an Audio/Video (AV) processor 204, a media access controller (MAC) 206, a physical device interface (PHY) 208, and a radio module 210. Data storage 202 may store any types of data. For example, data storage 202 may store audio and video data as well as other types of data. AV processor 204 receives and processes data from data storage 202. MAC 206 handles generating and parsing physical frames. PHY 208 handles how this data is actually moved to/from the radio module 210. Wireless HD specification supports two basic types of PHY: high rate PHY (HRP) and low rate PHY (LRP).

In accordance with one embodiment, HRP supports multi-Gbps data rates. HRP may operate in a directional mode (typically beam-formed mode). HRP may be used to transmit audio, video, data, and control messages. In one embodiment, HRP occupies roughly 1.7 GHz bandwidth.

In accordance with one embodiment, LRP supports multi-Mbps data rates. LRP may operate in a directional, omni-directional, or beam-formed modes. In one embodiment, LRP may be used to transmit control messages, beacons, and acknowledgements. In an alternative embodiment, LRP may further be used to transmit audio or compressed video. In yet another embodiment, LRP may further be used to transmit low-speed data. In one embodiment, LRP occupies one of three 91 MHz sub-channels within HRP channel as discussed below.

Separation of Video Pixel Data for UEP Support

Unequal Error Protection (UEP) means using different PHY coding scheme to protect most significant bits (msb) and least significant bits (lsb) of data portion separately. Having separate msb/lsbCRCs for video pixel data allows for msb/lsb data portions to be independently checked and used by receiver. FIG. 3 illustrates an example of a composite packet format with data regions separately encoded.

Statefull Coordinates Instead of Sequence Number (H, V) means horizontal/vertical coordinates for each pixel in a video frame, and it uniquely identifies any location in a particular video frame. The main advantage of using (H, V) instead of sequence number is it allows for more robust video data re-assembly on the receiver side, and also saves the redundant descriptor field in case sequence number is used.

Sequence numbers are thus not required in the header for video subpackets since H, V, frame number, and partition are sufficient to determine where data should go.

Figure 4:
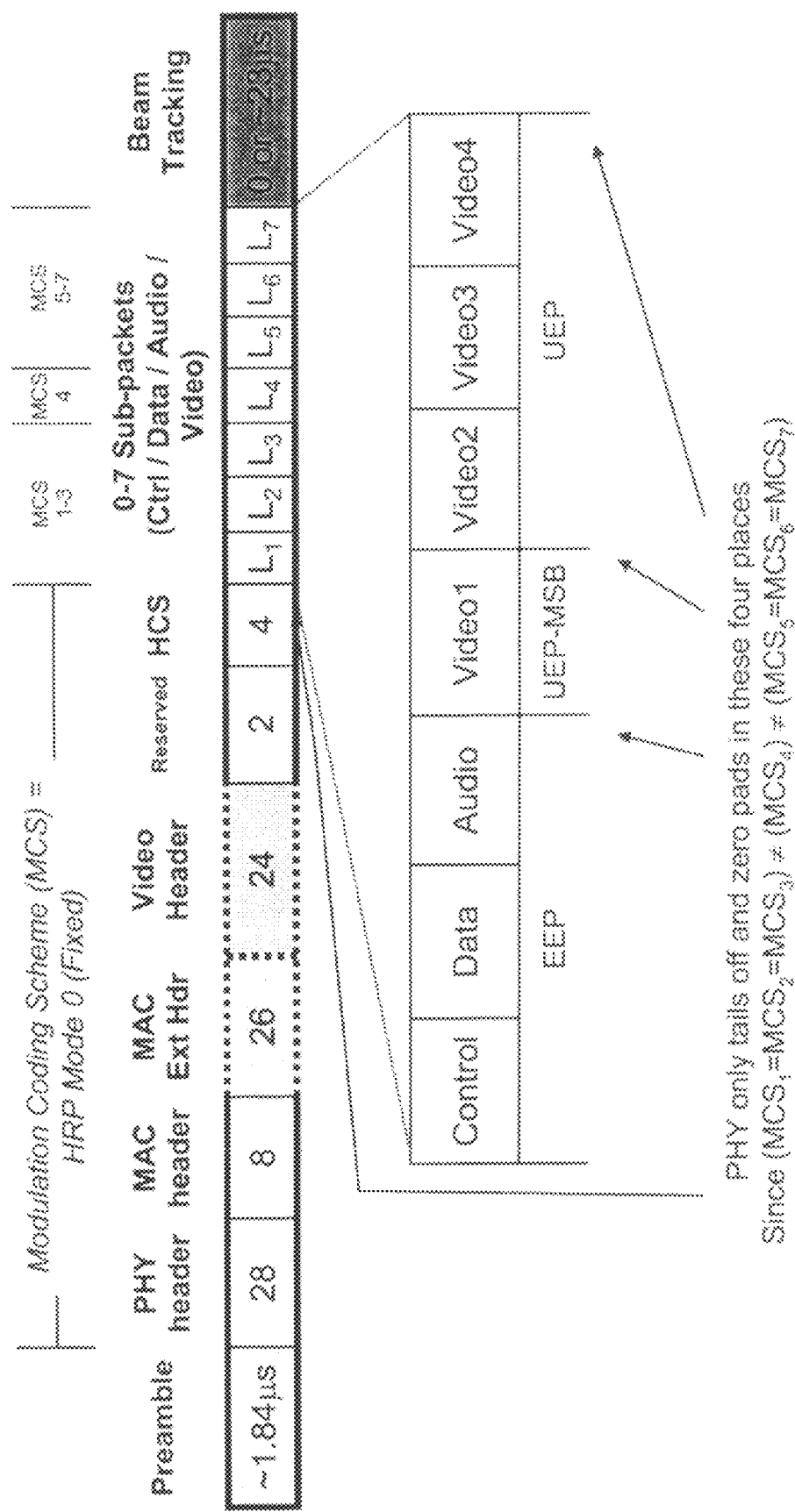
FIG. 4 is a block diagram of an example of a packet of a PHY mode segmentation.
Figure 14:
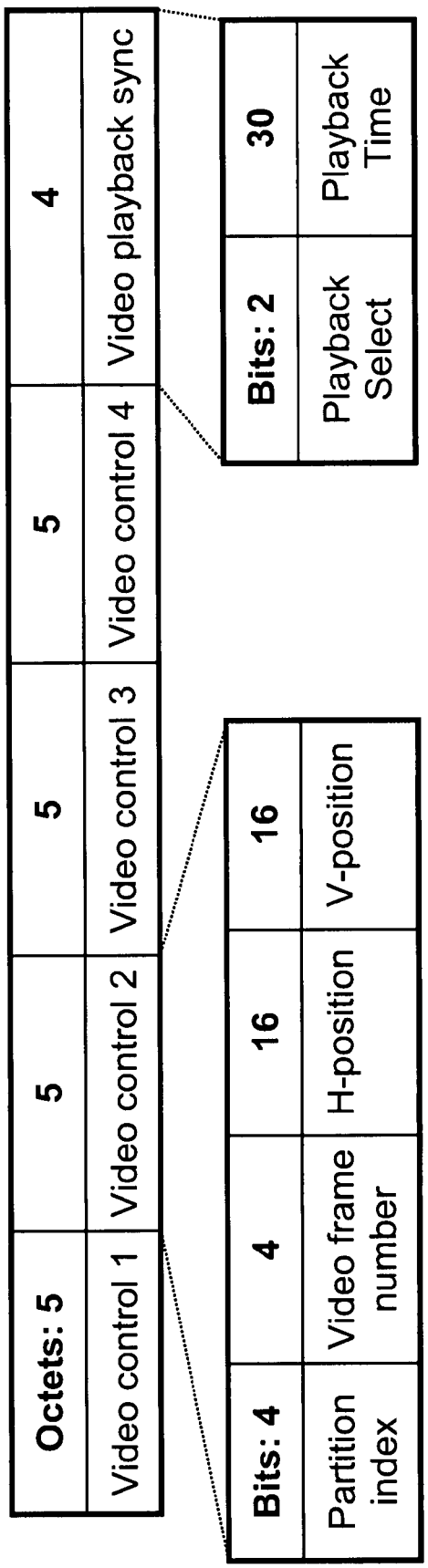
FIG. 14 is a block diagram of one embodiment of a packet format of a PHY mode segmentation.

FIGS. 4 and 14 illustrate an example of Video Header Optimization. Header fields for video sections are important for decoding video. Bit errors in video data can be tolerated in some cases but in other cases (i.e. H & V location) they cannot. Thus, video headers are placed in "video header" section. However audio, control, and data are more sensitive to bit errors, as the headers are, and thus since the non-header information for these types is of similar sensitivity as the header information, separate protection and coding for the two is not needed and the header information can be placed with the data information for these types.

Video Sub-Packet Size Scaling with Different PHY Coding Rate

While allowing video sub-packets of any size at any time results in the greatest flexibility, in one embodiment the sizes of the video sub-packets are fixed in length in bytes for the duration of a given video stream. One benefit of this is to reduce encoder and/or decoder implementation complexity. In another embodiment, the size of the duration of the video sub-packets in time is the same for the duration of a given video stream. In yet another embodiment, the number of video bytes in each sub-packet scales linearly with the data rate so that video sub-packets using a first MCS that delivers a data rate that is twice as high a second data rate has twice as many video bytes in the first video sub-packet as in the second video sub-packet.

Video Sub-Packet Size with Clean Pixel Boundary

Each video pixel is composed of different color elements (such as Red, Green, Blue or Y, Cb, Cr). For wireless video streaming, incoming video pixel data has to be "packetized" and sent out separately. In one embodiment, sub-packet sizes respect video pixel boundaries to avoid needing color component offset and thus simplifying implementations. If the size of the video sub-packet does not obey pixel boundary, it would require additional information to indicate how much data amount at the end of the subpacket is sent ("pixel offset"). It also creates complexity for interoperable operation.

Video Pixel Packing for Deep Color for UEP Support

Unequal Error Protection (UEP) divides the data bytes or other transfer units into groups of bits. In one embodiment, UEP divides bytes into two groups—most significant bits (mbs) and least significant bits (lsb). This can allow direct mapping if the transfer units are the same size as the pixel components as in the case with UEP over byte boundaries coding 24-bit-per-pixel RGB video. However, video pixel data has several different variations (16/20/24/30/36-bits per pixel) and thus such direct alignment is not possible. One embodiment cycles the pixel component bits in the same ratio as the msb/lsb groups to pack deep color (>8 bits per component) pixels into UEP blocks.

One embodiment uses similar techniques to pack the pixels into two different CRCs covering the lsb and msb groups. This can be used with the UEP techniques or independently.

FIGS. 5 and 6 illustrate a first embodiment of a deep color format. In this embodiment, the UEP splits the data stream into 4 most significant bits (msb) and 4 least significant bits (lsb) and the 4 lsb and 4 msb are used to generate an lsb CRC and msb CRC. Bit packing is required to pack non byte pixel components into byte stream. After packing, MAC and PHY see standard byte streams. Support of separate lsb/msb CRCs requires separate packing of upper and lower pixel component halves across upper and lower nibbles of bytes. For example, 30 bit mode packs 4 pixel groups in 5 byte chunks as illustrated in FIG. 5. FIG. 6 illustrates 36 bit mode packs 2 pixel groups into 3 byte chunks. Dividing of pixels into partitions occurs prior to packing each partition's pixels into bytes.

FIGS. 7 and 8 illustrate a second embodiment of a deep color format. Bit packing is required to pack non byte pixel components into byte stream. After packing, MAC and PHY see standard byte stream. lsb/msb CRCs are defined based on byte stream between MAC/PHY to simplify the design significantly—not related to specific bit locations in original pixel data bits. For example, 30 bit mode packs 4 pixel groups in 5 byte chunks as illustrated in FIG. 7. FIG. 8 illustrates 36 bit mode packs 2 pixel groups into 3 byte chunks. Dividing of pixels into partitions occurs prior to packing each partition's pixels into bytes.

Video Pixel Re-Ordering for Multiple Partitions

The main concept of multiple partitions is to separate adjacent pixel data in different video sub-packets, so in case there's packet loss the missing pixels can be reconstructed. When the video format is YCbCr and multiple partitions are in place, due to different data rate of each color elements, re-ordering the color element of each pixel data will achieve optimal reconstruction on the receiver side.

FIG. 9 illustrates a first embodiment of a first pixel partition. First bit in the sub-packet is always Y, bit 0 from pixel 0. Each color element switch on one byte boundary. Cb and Cr alternate in order (Y0, Cb0, Y1, Cr0, Y2, Cr2, Y3, Cb2, . . . ). The ordering is from horizontal pixel 0 and independent of row. This is needed for proper operation with 2×2 partition mode.

Data packing for deep color; for example 20 bits/pixel, it will be Y0[0 . . . 3, 5 . . . 8], Cb0[0 . . . 3, 5 . . . 8], Y0[4], Y1[0 . . . 2], Y0[9], Y1[5 . . . 7], Cr0[0 . . . 3, 5 . . . 8], . . . , etc.

FIG. 10 illustrates a second embodiment of a first pixel partition. First bit in the sub-packet is always Y, bit 0 from pixel 0. Each color element switch on one byte boundary. Cb and Cr alternate in order (Y0, Cb0, Y1, Cr0, Y2, Cr2, Y3, Cb2, . . . ). The ordering is from horizontal pixel 0 and independent of row. This is critical for proper operation with 2×2 partition mode.

Data packing for deep color; for example 20 bits/pixel, it will be Y0[0 . . . 9], Cb0[0 . . . 9], Y1 [0.9], Cr0[0 . . . 9], Y2[0 . . . 9], Cr2[0 . . . 9], Y3[0 . . . 9], Cb2[0 . . . 9], . . . , etc.

Figure 11:
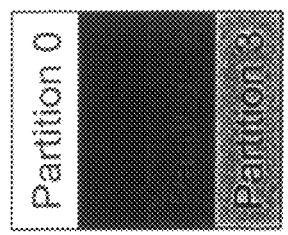
FIG. 11 is a table illustrating an example of multiple-partitions.

FIG. 11 illustrates YCbCr 4:2:2, 4 partitions. For example, YCbCr, 4:2:2, 16 bits/pixel.

FIG. 12 illustrates YCbCr 4:2:2, 4 partitions, Deep Color mode in accordance with a first embodiment. Pack pixels in the same partition group. For example, YCbCr, 4:2:2, 20 bits/pixel (each bracket represent one byte). Partition 0 may include {Y0} {Cb0} {Y0/Y2} {Cb0/Cr2} {Y2/Y4} {Cr2/Cr4} {Y4/Y6} {Cr4/Cb6} {Y6}. Partition 1 may include {Y1} {Cr0} {Y1/Y3} {Cr0/Cb2} {Y3/Y5} {Cb2/Cb4} {Y5/Y7} {Cb4/Cr6} {Y7}. This scheme balances Cb and Cr pixels across each partition. FIG. 13 illustrates YCbCr 4:2:2, 4 partitions, Deep Color mode in accordance with a second embodiment. Pack pixels in the same partition group. For example, YCbCr, 4:2:2, 20 bits/pixel (each bracket represent one pixel—10 bits). Partition 0 may include {Y0} {Cb0} {Y2} {Cr2} {Y4} {Cr4} {Y6} {Cb6} {Y8} {Cb8} {Y10} {Cr10}. Partition 1 may include {Y1} {Cr0} {Y3} {Cb2} {Y5} {Cb4} {Y7} {Cr6} {Y9} {Cr8} {Y11} {Cb10}. This scheme balances Cb and Cr pixels across each partition.

Playback Timestamp

Synchronization between audio and video can be achieved by controlling when the audio and video streams play out. This additionally can be used for buffer and link management. As illustrated in FIG. 14, a "playback timestamp" can be used to specify when a particular sample or section of audio or video is played back. In one embodiment, the four video sub-packet headers could each include a "playback timestamp" to indicate when they should be played back. However, timestamps can take many bits (30 in one embodiment) which can be scarce in headers. Thus in another embodiment, only one playback timestamp is specified in the video header and two additional "playback select" bits indicate which of the four video sub-packets the playback timestamp applies to. Thus the playback timestamp for any of the four video sub-packets can be communicated. Since the playback timestamp only needs to be communicated once per video frame, this is typically sufficient.

In the description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer.

Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
    an audio/video (AV) processor;
    a media access controller (MAC) coupled to the AV processor for generating a composite packet having a format configured to carry audio, video, and data traffic with fields in a header of the composite packet specifying video-specific information, wherein the MAC reorders a color element associated with pixel data in a partition;
    a physical device interface (PHY) coupled to the MAC, the PHY to encode and decode between a digital signal and a modulated analog signal, the PHY comprising a high rate physical layer circuit (HRP) and a low rate physical layer circuit (LRP); and
    a radio frequency (RF) transmitter coupled to the PHY to transmit data.

2. The apparatus of claim 1 wherein the composite packet comprises sub-packets sharing a common MAC and PHY header.

3. The apparatus of claim 1 wherein a msb and lsb data portion of the composite packet is transmitted using different Modulation Coding Scheme (MSC).

4. The apparatus of claim 1 wherein a msb and lsb data portion of the composite packet is protected using an msb and lsb CRC.

5. The apparatus of claim 1 wherein the composite packet comprises horizontal and vertical coordinates in a video sub-packet header of the composite packet to uniquely identify any location in a particular video frame.

6. The apparatus of claim 1 wherein a size of the video sub-packets of the composite packet is scaled with different PHY coding rates.

7. The apparatus of claim 1 wherein a size of the video sub-packets of the composite packet are determined when for the duration of the video stream.

8. The apparatus of claim 1 wherein the video sub-packets of the composite packet include clean pixel boundaries.

9. The apparatus of claim 1 wherein the deep color video sub-packets of the composite packet support UEP.

10. The apparatus of claim 1 wherein the MAC reorders a color element for each pixel data in multiple partitions for improved reconstruction.

11. The apparatus of claim 1 wherein at least one video playback time is included in the video header portion.

12. An apparatus comprising:
    an audio/video (AV) processor;
    a media access controller (MAC) coupled to the AV processor for generating a composite packet having a format configured to carry audio, video, and data traffic with fields in a header of the composite packet specifying video-specific information, wherein only one playback time field is included for a plurality of video sub-packets and a playback select is specified to indicate which of the video sub-packets the playback time describes;
    a physical device interface (PHY) coupled to the MAC, the PHY to encode and decode between a digital signal and a modulated analog signal, the PHY comprising a high rate physical layer circuit (HRP) and a low rate physical layer circuit (LRP); and
    a radio frequency (RF) transmitter coupled to the PHY to transmit data.

13. A method comprising:
    generating a composite packet with a wireless HD AV format configured to carry audio, video, and data traffic, with fields in a header of the composite packet specifying video-specific information,
    wherein a msb and lsb video portion of the composite packet transmitted is protected by an msb and lsb CRC; and
    reordering a color element associated with pixel data in a partition.

14. The method of claim 13 wherein the composite packet comprises sub-packets sharing a common MAC and PHY header.

15. The method of claim 13 wherein the composite packet comprises horizontal and vertical coordinates in a video sub-packet header of the composite packet to uniquely identify any location in a particular video frame.

16. The method of claim 13 wherein a size of the video sub-packets of the composite packet is scaled with different PHY coding rate.

17. The method of claim 13 wherein the video sub-packets of the composite packet include clean pixel boundaries.

18. The method of claim 13 wherein the deep color video sub-packets of the composite packet support UEP.

19. The method of claim 13 further comprising:
    reordering a color element for each pixel data in multiple partitions for improved reconstruction.

20. The method of claim 13 wherein at least one video playback time is included in the video header portion.

* * * * *